United States Patent [19]

Matsunaga et al.

[11] Patent Number: 5,153,288

[45] Date of Patent: Oct. 6, 1992

[54] CLADDING MATERIAL FOR OPTICAL FIBER AND METHOD FOR ITS MANUFACTURE

[75] Inventors: Tadayo Matsunaga; Heiroku Suganuma; Tadanori Fukuda; Genzaburo Nakamura, all of Shiga, Japan

[73] Assignee: Toray Industries, Inc., Japan

[21] Appl. No.: 661,397

[22] Filed: Feb. 26, 1991

[51] Int. Cl.$^5$ .................. C08F 18/20; C08F 22/40
[52] U.S. Cl. .................. 526/245; 526/262; 428/392
[58] Field of Search .................. 526/245, 262

[56] References Cited

FOREIGN PATENT DOCUMENTS

| | | | |
|---|---|---|---|
| 60-235817 | 11/1985 | Japan | 526/245 |
| 61-296012 | 12/1986 | Japan | 526/245 |
| 3107105 | 5/1991 | Japan | 526/245 |
| 3111411 | 5/1991 | Japan | 526/245 |

*Primary Examiner*—Joseph L. Schofer
*Assistant Examiner*—N. Sarofim
*Attorney, Agent, or Firm*—Austin R. Miller

[57] ABSTRACT

A cladding material for plastic optical fibers is disclosed. The cladding material comprises mainly a copolymer comprising a fluoroalkyl methacrylate and an N-aliphatic maleimide as monomer units. The cladding material has low refractive index and high thermal stability, so that an optical fiber with a large acceptance angle can be obtained.

10 Claims, No Drawings

CLADDING MATERIAL FOR OPTICAL FIBER AND METHOD FOR ITS MANUFACTURE

FIELD OF THE INVENTION

This invention relates to a cladding material with low refractive index and high thermal stability, being useful for a cladding component of a plastic optical fiber.

DESCRIPTION OF PRIOR ART

Optical fibers are composed of a core, within which light travels, and a cladding, which sheathes the core. In order to confine the light to the core, refractive index of the cladding has to be lower than that of the core. And the larger the difference in refractive index between the core and the cladding, the more light can be accepted from the end of the optical fiber.

So an optical fiber employing a polymer with low refractive index as a cladding material is favorable for accepting much light. The light acceptance from the fiber end usually is shown by the value of acceptance angle, which is calculated from the refractive indexes of core and cladding.

As a core material, quartz glass and a highly transparent plastic such as polymethyl methacrylate usually are employed.

On the other hand, various fluorine-containing polymers are generally used as a cladding material, because of their low refractive indices.

For example, fluoroethylene/fluoropropylene copolymer is known as a cladding material when the core material is quartz glass [Applied Optic 14, 156 (1975)].

When the core material is polymethyl methacrylate or the like, a vinylidene fluoride/tetrafluoroethylene copolymer is known (Japanese Examined Patent Publication No. 63-67164), and a hexafluoroacetone/vinylidene fluoride copolymer is known (Japanese Un-examined Patent Publication No. 61-22305).

These fluorine-containing polymers are inferior in transparency because of their crystallinity, although they are excellent in mechanical strength, thermal stability and chemical resistance. As the temperature of these polymers are raised, the crystallization proceeds to lower their transparency, even if they have good transparency at room temperature, which can be obtained by quick cooling just after molding or by solvent casting. This is a serious problem because bad transparency of the cladding component leads to decrease of light transmittance of the opitical fiber.

For example, an optical fiber employing vinylidene fluoride/tetrafluoroethylene copolymer as the cladding material and polymethyl methacrylate as the core material must be used at most 70° C., owing to the tendencey to cause crystallization of the cladding.

These fluoroolefin polymers, therefore, are not satisfactory for the cladding material.

On the other hand, to obtain a cladding material with improved high transparency, various fluoroalkyl methacrylate polymers are employed. The following polymers are proposed as a cladding material in case that the core material is polymethyl methacrylate: copolymers of methacrylates or acrylates with linear fluoroalkyl groups and methyl methacrylate (Japanese Examined Patent Publication No. 43-8978); terpolymers of methacrylate with long fluoroalkyl group (40-70 wt.%), methacrylates with short fluoroalkyl group (20-50 wt.%), and methyl methacrylate (Japanese Un-examined Patent Publication No. 62-265606).

These methacrylate polymers, however, have the disadvantage that they easily decompose by heat. During their melt molding, decrese of their viscosity and gas generation usually occur. Hence, it is difficult to produce optical fibers without any troubles when fluoroalkyl methacrylate polymers are employed as a cladding material.

According to detail of thermal decomposition of the fluoroalkyl methacrylate polymers, depolymerization (i.e., unzipping of polymer chain) has proved to occur during its decomposition. The longer the fluoroalkyl group is, the more easily depoloymerization of polymer tends to proceed. Therefore, it is important to suppress the depolymerization of the fluoroalkyl methacrylate polymers, especially those with long fluoroalkyl group, keeping their excellent characteristics when used as a cladding material As a method of supressing thermal decomposition of the fluoroalkyl methacrylate polymers, the following methods are known so far:

(1) o-methyl phenyl maleimide is copolymerized with the fluoroalkyl methacrylates (Japanese Un-examined Patent Publication No. 60-235817).

(2) fluoroalkyl acrylates are copolymerized with the fluoroalkyl methacrylates (Japanese Un-examined Patent Publication No. 64-79704).

Although the copolymer by method (1) can be improved in reducing thermal decomposituon, it is colored which caused by the phenyl group of o-methyl phenyl maleimide. In addition, introduction of o-methyl phenyl maleimide unit leads to the increase of the refractive index of the polymer, which is undesireble for the cladding material. Therefore, the copolymer obtained by the method (I) is unsuitable for cladding material by reason of color and increased refractive index.

The method (2) also can supress thermal decomposition of the copolymer to some extent, but it decreases thermal deformation temperature of the copolymer because of the copolymerization of poly(fluoroalkyl acrylates) having low glass transition temperature. Therefore, the copolymer obtained by the method (2) is unsuitable for cladding material by decreased glass tansition temperature.

SUMMARY OF THE INVENTION

An object of the present invention is to provide a cladding material having low refractive index, high thermal stability, and high glass transition temperature.

Another object of the present invention is to provide a cladding material useful for optical fibers with a large acceptance angle.

This invention provides a cladding material characterized in comprising a copolymer which comprises N-aliphatic maleimide and fluoroalkyl methacrylate as monomer units. By copolymerizing a small amount of N-aliphatic maleimide to the fluoroalkyl methacrylate, the thermal stability of the obtained copolymer is considerably improved without virtual increase of refractive index and decrease of glass transition temperature of the polymer.

DESCRIPTION OF PREFERRED EMBODIMENTS

The invention involves the use a small amount of N-aliphatic maleimide with fluoroalkyl methacrylate as a monomer unit of the main polymer of cladding material.

In the course of our study to improve thermal stability of fluoroalkyl methacrylate polymers, it has been revealed that copolymerization with N-aliphatic maleimide is very effective to suppress the depolymerization, keeping their excellent characteristics as a cladding material for optical fiber.

On the other hand, as a core material, it is known that N-aliphatic maleimide is employed as a monomer component with methylmethacrylate and/or stylene, in order to increase its glass transition temperature and heat stability (U.S. Pat. No. 4,810,055). But, employment of maleimide to improve cladding material was not studied because maleimide tended to increase in refractive index of polymer.

N-aliphatic maleimides emplyed in this invention are represented by the following general formula:

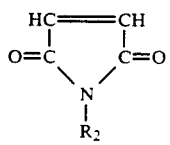

wherein, $R_2$ is an aliphatic group. The aliphatic group may contain substituted fluorine(s).

Among the N-aliphatic maleimides, maleimides substituted with aliphatic hydrocarbon or aliphatic fluorocarbon are preferred in view of the refractive index of the polymer for cladding. Moreover, N-aliphatic maleimide with no characteristic absorption in visible light region are preferred, considering the light transmittance of the optical fiber. Further, in view of the balance of the combination of the mechanical charasteristics of the polymer, glass transition-raising property and heat stability, the N-aliphatic maleimide has, preferably, the aliphatic group with 1 to 6 carbon atoms. The aliphatic group includes methyl, ethly, propyl, isopropyl, butyl, isobutyl, secondary-butyl, tertially-butyl, 2,2-dimethylpropyl, hexyl, cyclohexyl, trifluoromethyl, trifluoroethyl, tetrafluoropropyl, hexafluoropropyl, and the like. Further, in view of the feasibility of distillation to improve the purity of the monomer, isopropyl, isobutyl, secondary-butyl, tertially-butyl, 2,2-dimethylpropyl and the like, which are liquid at room temperature, are especially preferred.

Among N-substituted maleimides, maleimides substituted with an aryl group has high refractive index and are colored, and so they are not suitable for a cladding material of optical fiber.

Preferable N-aliphatic maleimide content in the copolymer for cladding is 0.2-30 wt. %. More preferably, the amount of N-aliphatic maleimide is 1-20 wt. %. If the amount of N-aliphatic maleimide is lower than 0.2 wt. %, enough improvement on thermal stability cannot be attained. If the amount is higher than 30 wt. %, the copolymer becomes unsuitable for cladding material because mechanical properties such as flexibility and transparency of the copolymer are lowered.

With regard to fluoroalkyl methacrylate, its fluorine content is important to obtain low refractive index polymer. The higher the fluorine content of the polymer, the lower its refractive index. The fluorine content of fluoroalkyl methacrylate can be easily varied by controlling the number of fluorine atoms in its fluoroalkyl group.

However, too long fluoroalkyl group leads to decrease of glass transition temperature of the polymer.

And too long fluoroalkyl group also leads to decrease of transparency of the polymer, probably because of the crystallization of long fluoroalkyl group.

From these viewpoints, the prefer number of fluorine atoms in fluoroalkyl group is 8-21. If the number of fluorine atoms in fluoroalkyl group is lower than 8, enough low refractive index of the polymer cannot be attained. If the number of fluorine atoms of fluoroalkyl group is higher than 21, it is difficult to keep both glass transition temperature and transparency of the polymer enough high.

Fluoroalkyl methacrylates emplied in this invention are preferably represented by the following general formula:

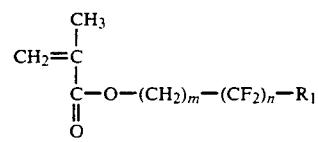

wherein $R_1$ is H or F; m is 1 or 2; n is an integer of 4 to 10.

Preferable fluoroalkyl methacrylate content in the copolymer for cladding is 70-99.8 wt. %. More preferably, the amount of N-aliphatic maleimide is 80-99 wt. %.

The copolymer for cladding material can be comprise another component as a monomer unit, with N-aliphatic maleimide and fluoroalkyl methacrylate. The most preferred another component is methyl methacrylate.

Copolymerization of methyl methacrylate can endow the polymer with flexibility and affinity to the core, keeping its low refractive index and high thermal stability. The prefer amount of methyl methacrylate is 10-29.8 wt.%, from these points of view. When the methyl methacrylate is employed as another component, fluoroalkyl methacrylate content and N-aliphatic maleimide content are preferably 70 -89.8 wt. % and 20-0.2 wt. %, respectively.

However, the invention is not restricted thereto and any comonomer may be used as long as it has a copolymerization compatibility with the N-aliphatic maleimide and fluoroalkyl methacrylate. Further, adding a trace amount of heat stabilizer and/or antioxidant, which does not degrate the light transmittance, is also included within the scope of the present invention.

As regards to the polymerization method, bulk polymerization, suspension polymerization, emulsion polymerization or solution polymerization may be employed. Among these methods, bulk polymerization and solution polymerization are preferable, considering the transparency of the obtained copolymer.

Examples of the solvent for solution polymerization include fluorine-containing solvents such as 1,1,2-trichloro-1,2,2-trifluoroethane, 1,1,2,2-tetrachloro-1,1-difluoroethane, (trifluoromethyl)benzene and 1,3-bis(-trifluoromethyl)benzene; chlorine containing solvents such as 1,1,2,2-tetrachloroethane. The solvent is not restricted to these compounds and any solvent which is inactive against the polymerization reaction and which can dissolve the monomers and the polymer may be used.

Ordinary polymerization initiators, for example, azo compounds such as azobisisobutyronitrile, azo-t-butane and azo-t-octane, or organic peroxides such as di-t- butylperoxide and di-t-butylbenzoate are preferably used.

As molecular weight controlling agents, mercaptans such as n-propyl, n-butyl, n-hexyl, n-dodecyl, i-butyl, i-pentyl, and t-butyl mercaptan can be used.

For uniform quality of the obtained polymer, continuous polymerization is better, but, of course, batch polymerization can be applied. The polymer mixture thus obtained is subjected to a monomer-elmination step to remove volatiles such as unreacted monomers and solvent.

The obtained copolymer may be supplied to the cladding material, alone or blending with additives within an amount substantially keeping its good properties. As the additives, a stabilizer and/or an antioxidant may be used.

Thereafter, the cladding material and a core material are fed separately to a composite spinning machine with a core-cladding type spinneret, make a core-cladding structure, and be co-spun and drawn by usual way to form an optical fiber of core-cladding structure.

A core material of optical fibers may be emplyed a polymer which can be used as a core material of plastic optical fibers. Polymers comprising methyl methacrylate are preferable as s core polymer. The polymer may be contain an N- aliphatic maleimide with a methyl methacrylate as a monomer units, in order to obtain a optical fiber having increased heat-resistance during end use.

Further coating of the core-cladding type optical fiber is preferable. As coating materials, polyethylene, polypropylene, ethlene-propylene copolymer, blend of these polymers, polyolefin with organosilyl group, ethylene-vinyl acetate copolymer, poly(vinyl chloride), poly(vinylidene fluoride), nylon resin, polyester resin, nylon elastomer, polyester elastomer, and polyurethane are preferable. Coating of these polymers are preferably conducted below 240° C., so as to keep the light transmittance of the optical fiber high.

After spinning, core-cladding optical fibers may be placed in a row, and be adhered each other at temperature above the glass transition temperature of the copolymer for cladding, to form a sheet of optical fibers.

Thanks to excellent chemical resistance of the cladding material of the present invention, a resin solution with heat resistance, a resin with good adhesive property, and a resin with colored dyes or fluorescent dyes may be coated to the fiber.

The polymer of the present invention has improved thermal stability compared with fluoroalkyl methacrylate polymers known previously. Therefore, it is attainable to produce without any troubles an optical fiber having large acceptance angle by use of the cladding material of the present invention.

Further, the optical fiber whose cladding made from the cladding material of this invention has a good heat-resisting durability because of its low amount of monomer residure generated by thermal decomposition.

Moreover, the optical fiber using the cladding material of this invention can be used at higher temperature than the conventional optical fiber because the glass transition temperature of the cladding material is higher than the conventional one.

Thus, the present invention has a great industrial significance and value for optical fibers.

The cladding material of this invention is useful for general plastic optical fibers, especially for plastic optical fibers with a large acceptance angle.

The present invention will now be described more concretely by way of the examples thereof.

Some abbreviations used in examples are shown below together with their chemical structures.

(1) 3,3,4,4,5,5,6,6,7,7,8,8,9,9,10,10,10-heptadecafluorodecyl methacrylate: 17FM

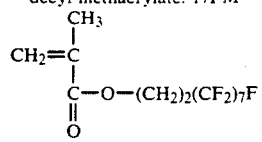

(2) 2,2,3,3,4,4,5,5,-octafluoropentyl methacrylate: 8FM

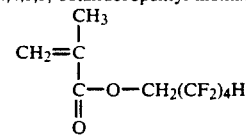

(3) 2,2,3,3-tetrafluoropropyl methacrylate: 4FM

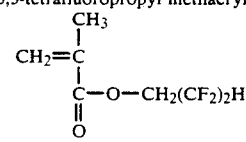

(4) N-cyclohexyl maleimide: CH-MID

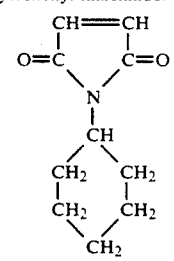

(5) N-isopropyl maleimide: iPr-MID

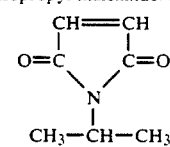

(6) mehtyl methacrylate: MMA

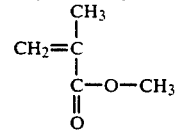

(7) N-(o-methyl)phenyl maleimide: (o-Me)Ph-MID

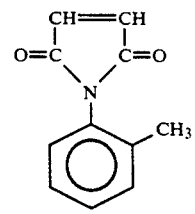

(8) 2,2,3,3,4,4,5,5,-octafluoropentyl acrylate: 8FA

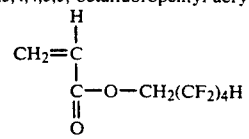

EXAMPLE 1

| 17-FM | 86.5 wt parts |
|---|---|
| CH-MID | 13.5 wt parts |
| azobisisobutyronitrile | 0.01 wt parts |
| n-butyl mercaptan | 0.005 wt parts | was prepared after distilling each of the monomers, and the mixture was fed into a glass ampule, and then, the ampule was degassed by three vaccum freeze thaw cycles, and sealed. After 8 hours of heating at 100° C., the ampule was cooled and then opened. The obtained clear solid block of copolymer was cooled in liquid nitrogen and crushed into small pieces. The obtained copolymer was then dried in a vacuum oven at 115° C. for 48 hours, to remove residual monomers.

The thermal stability of thus obtained copolymer was evaluated with its viscosity retention, which was calculated by comparing the viscosity of the polymer after treated at 240° C. for 60 minutes with that of the copolymer after treated at 240° C. for 10 minutes.

The viscosity retention of the above obtained copolymer was 86 %.

The above obtained copolymer has 1.395 of refractive index, which is much lower than that of conventional polymers for cladding.

Thus, the obtained copolymer has an excellent thermal stability and low refractive index, so that was very useful for cladding material of an optical fiber with large acceptance angle.

The above obtained copolymer was supplied as a cladding material, and general polymethyl methacrylate was supplied as a core material, to a composite spining machine having a core-cladding type spinnert. And then, a core-cladding type optical fiber was spun at a spinning temperature of 240° C. and was drawn 2.0 times at 160° C., to obtain a core-cladding type optical fiber having a core radius of 980 μm and a cladding thickness of 10 μm, without troubles.

The thermal stability of thus obtained optical fiber was evaluated as the light trancemittance retention, which was measured by the following procedure: 10 m of the optical fiber was treated in oven at 80° C. for 500 hours. By comparing the loss of light transmittance before and after the heat treatment, the light trancemittance retention of the optical fiber was calculated.

Thus derived light transmittance retention of the above obtained optical fiber was 95 %.

Flexibility of the optical fiber was evaluated by measuring how many times the optical fiber wound until its fracture at angle of 180° around a rod with a diameter of 5 mm under load of 700 g.

The number of wind until fracture of the above obtained optical fiber was 1100.

Thus, an optical fiber with an execellent heat-resistance while keeping the good light transmittance and mechanical characteristics, was obtained without troubles, by use of a cladding material according to this invention.

EXAMPLES 2-4

Copolymers for cladding material were obtained and then optical fibers were obtained in the same manner as Example 1, except that the monomer composition of copolymers were changed as shown in Table 1.

The properties of obtained polymers for cladding and obtained optical fibers are shown in Table 1.

Thus, obtained copolymers for cladding and obtained optical fibers are both excellent as same way as Example 1.

EXAMPLE 5

A mixture of

| 8FM | 57.6 wt parts |
|---|---|
| iPr-MID | 2.4 wt parts |
| 1,1,2.2-tetracloro-1,2-difluoroethane | 40.0 wt parts |
| azobisisobutyronitrile | 0.01 wt parts | was fed to a polymerization bath at a rate of 5 kg/hour while filtering the mixture through a Teflon filter with a pore diameter of 0.1 μm. The polymerization temperature was 80° C., and the liquid level was controlled so as to obtain an average dwelling time of 4 hours. The reacted polymer solution was discharged by a metering pump at a rate of 5 kg/hour. This solution was supplied to an extruder with a vent, and the unreacted monomers and solvent were removed at 190-250° C. at 250-1 torr. The solution was then introduced into a core-cladding type fiber spinning machine as a cladding material.

On the other hand, as a core material, methyl methacrylate/N-isopropyl maleimide copolymer (65/35 in weight) was prepared in the same way as described in U.S. Pat. No. 4,810,055, and then supplied to the spinneret.

The properties of the polymer for cladding and optical fiber thus obtained are shown in Table 1.

COMPARATIVE EXAMPLE 1

Polymers for cladding was obtained in the same manner as Example 1, except that only 17FM was used as a monomer component. As shown in Table 1, viscosity of thus obtained polymer after thermal treatment was too extremely small to be measured correctly.

Thus this polymer had very bad thermal stability, so that the obtained fiber was poor in light transmittance because of thermal decomposition of cladding material during spinning and drawing processes. Moreover, the obtained fiber was very poor in thermal stability, because of the extremely bad thermal stability of cladding component.

COMPARATIVE EXAMPLE 2

Copolymer for cladding was obtained and then an optical fiber was obtained in the same manner as Example 1, except that 50 wt. % of 17FM and 50 wt. % of iPr-MID were used as monomer components.

The obtained copolymer was bad in transparency, and rather brittle. And the obtained optical fiber had low light transparency and inferior flexibility as shown in Table 1.

Therefore, this polymer was insuitable for cladding material of an optical fiber.

COMPARATIVE EXAMPLE 3

Copolymer for cladding was obtained and then an optical fiber was obtained in the same manner as Example 1, except that 50 wt. % of 8FM, 30 wt. % of 4FM and 20 wt. % of MMA were employed as monomer components.

Thermal stablity of the obtained polymer was not good and gas generation occured during a thermal treatment.

Light transmittance retention and flexibility of the optical fiber was not good, either.

Therefore, this polymer was insuitable for cladding material of an optical fiber.

COMPARATIVE EXAMPLE 4

Copolymer for cladding was obtained and then an optical fiber was obtained in the same manner as Example 1, except that 60 wt. % of 17FM, 5 wt. % of (o-Me)Ph-MID and 35 wt. % of MMA were employed as monomer components.

Thus obtained copolymer was a little colored yellow, and its refractive index was reratively high, as shown in Table 1.

Light transmittance and flexibility of the obtained optical fiber was not satisfactory.

Therefore, this polymer was insuitable for cladding material of an optical fiber.

COMPARATIVE EXAMPLE 5

Copolymer for cladding was obtained and then an optical fiber was obtained in the same manner as Example 1, except that 40 wt. % of 17FM, 40 wt. % of 8FA and 20 wt. % of MMA were employed as the monomer components.

Thus obtained copolymer was in rubber state at room temperature, because of low glass transition temperature of it. Light transmittance retention of the obtained optical fiber whose cladding material was the polymer obtained above, was poor, because of its low glass transition temperature.

Therefore, this polymer was insuitable for cladding material of an optical fiber.

We claim:

1. A cladding material for optical fibers with a core-cladding structure, which comprises a copolymer comprising 70-99.8 wt. % of a fluoroalkyl methacrylate and 30-0.2 wt. % of an N-aliphatic maleimide as monomer units.

2. A cladding material according to claim 1, wherein the fluoroalkyl group of said fluoroalkyl methacrylate has 8-21 fluorine atoms.

3. A cladding material according to claim 1, wherein said fluoroalkyl methacrylate is represented by the general formula

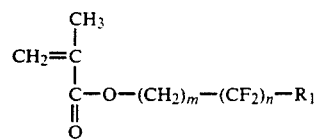

wherein $R_1$ is H or F; m is 1 or 2; n is an integer of 4 to 10.

4. A cladding material according to claim 3, wherein $R_1$ is F, m is 2, n is 8 in said general formula.

5. A cladding material according to claim 1, wherein the aliphatic group of said N-aliphatic maleimide has 1-6 carbon atoms.

6. A cladding material according to claim 5, wherein said aliphatic group is at least one group selected from the group consisting of isopropyl, isobutyl, secondary-butyl, tertiary-butyl and 2,2-dimethylpropyl group.

7. A cladding material according to claim 5, wherein said aliphatic group is isopropyl group.

8. A cladding material according to claim 1, wherein said copolymer comprises 80-90 wt. % of a fluoroalkyl methacrylate and 20-1 wt. % of an N-aliphatic maleimide as monomer units.

9. A cladding material according to claim 1, wherein said copolymer consists essentially of 70-89.9 wt. % of a fluoroalkyl methacrylate, 20-0.2 wt. % of an N-aliphatic maleimide and 10-29.8 wt. % of a methyl methacrylate as monomer units.

10. A cladding material according to claim 1, wherein said copolymer contains a stabilizer and/or an antioxidant.

TABLE 1

|  | Monomer Composition (in Weight) | Polymer Properties | | | Optical Fiber Properties | | |
| --- | --- | --- | --- | --- | --- | --- | --- |
|  |  | Refractive Index (nd) | Glass Transition Temperature (°C.) | Viscosity Retention (at 240° C.) (%) | Loss of Light Transmittance (650 nm) (dB/km) | Light Transmittance Retention (90° C. × 500 hs) (%) | Flexibility (number of times) |
| Ex. 1 | 17FM/CH-MID (86.5/13.5) | 1.395 | 81 | 86 | 135 | 95 | 1100 |
| Ex. 2 | 17FM/iPr-MID/MMA (81/2/17) | 1.399 | 73 | 60 | 129 | 98 | 2000 |
| Ex. 3 | 17FM/CH-MID (73/27) | 1.411 | 97 | 92 | 142 | 99 | 900 |
| Ex. 4 | 8FM/17FM/MMA/iPr-MID (40/40/11/9) | 1.402 | 78 | 75 | 138 | 93 | 1800 |
| Ex. 5 | 8FM/iPr-MID (96/4) | 1.387 | 32 | 71 | 295 | 85 | 1600 |
| C. Ex. 1 | 17FM (100) | 1.375 | — | <1 | 350 | <1 | 2000 |
| C. Ex. 2 | 17FM/iPr-MID (50/50) | 1.451 | 113 | 92 | 540 | 90 | 200 |
| C. Ex. 3 | 8FM/4FM/MMA (50/30/20) | 1.410 | 75 | 45 | 141 | 82 | 700 |
| C. Ex. 4 | 17FM/(o-Me)Ph-MID/MMA (60/5/35) | 1.436 | 92 | 75 | 200 | 90 | 500 |
| C. Ex. 5 | 17FM/8FA/MMA (40/40/20) | 1.398 | 19 | 68 | 150 | 45 | 2200 |